United States Patent [19]
Haworth et al.

[11] 3,918,840
[45] Nov. 11, 1975

[54] COMPRESSOR FOR GAS TURBINE ENGINES

[75] Inventors: Lional Haworth; David Bruce Foweraker; Richard Armstrong Foster, all of Bristol, England

[73] Assignee: Rolls-Royce (1971) Limited, London, England

[22] Filed: Apr. 18, 1974

[21] Appl. No.: 461,968

[30] Foreign Application Priority Data
May 2, 1973 United Kingdom............... 20947/73

[52] U.S. Cl. .............................. 416/190; 416/195
[51] Int. Cl.² .......................................... F01D 5/22
[58] Field of Search ........................... 416/190–193, 416/189, 195, 244, 244 A

[56] References Cited
UNITED STATES PATENTS
| | | | |
|---|---|---|---|
| 1,820,467 | 8/1931 | Liska | 416/195 |
| 2,959,393 | 11/1960 | Rankin | 416/192 X |
| 3,048,365 | 8/1962 | Foster et al. | 416/90 |
| 3,095,138 | 6/1963 | Warnken | 416/244 A X |
| 3,556,675 | 1/1971 | Howald et al. | 416/192 X |

FOREIGN PATENTS OR APPLICATIONS
989,260  4/1965  United Kingdom................ 416/191

Primary Examiner—Everette A. Powell, Jr.
Attorney, Agent, or Firm—Stevens, Davis, Miller & Mosher

[57] ABSTRACT

A compressor for gas turbine engines, the compressor having an annular array of blades surrounded by a circumferentially continuous shroud ring having recesses pivotally engaged by extensions of the blades so that the radially outer ends of the blades are supported in normal operation, e.g. against vibration, but if the blades bend under an impact load, e.g. a bird strike, the outer ends can accommodate the bending by their freedom to pivot in the recesses or even by withdrawing therefrom.

2 Claims, 4 Drawing Figures

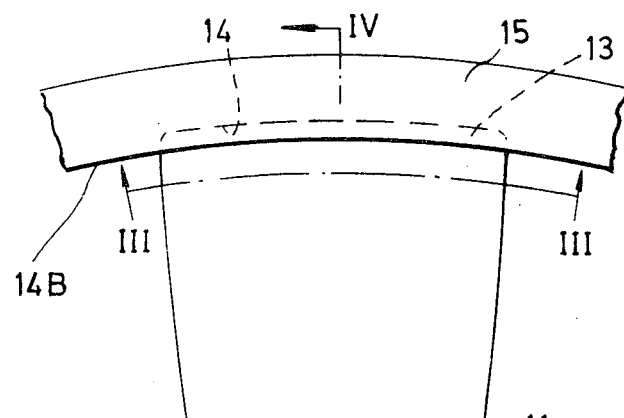
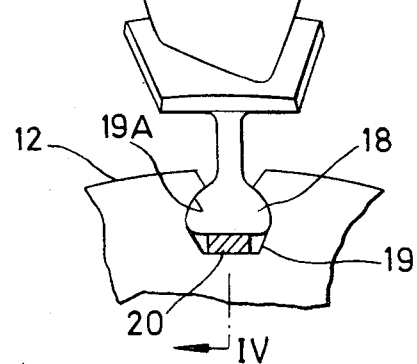
FIG.2.
FIG.3.
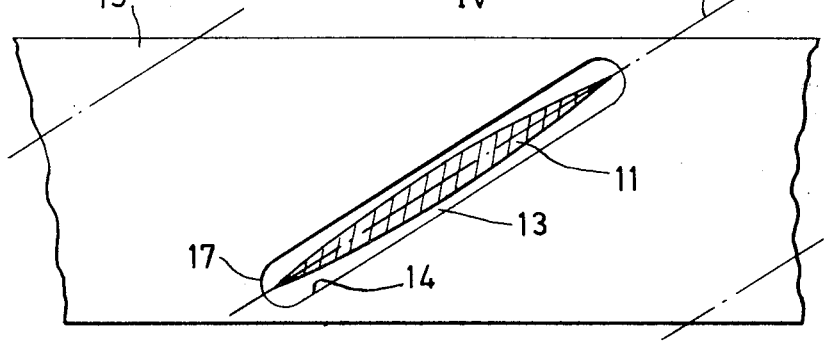

COMPRESSOR FOR GAS TURBINE ENGINES

This invention relates to a compressor for gas turbine engines.

Gas turbine engines used for aircraft propulsion are subject to the hazard to birds entering the air intake of the engine and causing damage to the blades of the air compressor of the engine.

Relatively long blades can to some extent absorb an impact load, such as is produced by a bird striking a blade, by flexing, but the ability to flex must usually be inhibited by the need to avoid vibration to which long blades are prone.

It is an object of this invention to provide a compromise whereby both ability to flex and ability to withstand vibration are provided.

It is known to provide an annular array of fan blades with a circumferential continuous shroud ring having recesses in a radially inner surface thereof engaged by spigots provided at the radially outer ends of the blades. Such spigots provide support for the blades with beneficial results as regards vibration (the support raises the natural frequency of the blade) but the spigots are subject to being broken in case of a said impact load. Alternatively, if the spigots are sufficiently strong to withstand the load, the outer end support of the blades reduces their ability to flex and thereby absorb the load without breaking.

According to this invention there is provided a compressor for a gas turbine engine, comprising a central rotor body, an array of radial blades connected at their radially inner ends of the body, a circumferentially continuous shroud ring surrounding the blades at the radially outer ends thereof, and recesses in a radially inner surface of said ring withdrawably engaged by said radially outer ends of the blades, characterized in that said recesses and said outer ends are shaped to constitute a pivot for angular motion of the blade about an axis lying substantially parallel to a tangent of said radially inner surface of the ring.

If a said blade is subject to a said impact load the consequent bending of the blade is accommodated by said pivot. Such bending tends to partially withdraw said outer end from the recess and, when the impact has been absorbed and the blade has straightened again, the end of the blade resumes its former position in the recess. The characteristic of the pivot is necessarily such as to allow the end of the blade to slide completely out of the recess and this may occur if a certain load is exceeded. Such a situation would of course result in out-of-balance forces on the compressor and possibly permanant damage to the blade. But the probability is for such a situation to be less destructive than an actual breakage of the blade.

During normal operation the engagement between the extension and the recess provides support against vibration.

An example of a compressor according to this invention will now be described with reference to the accompanying drawings wherein:

FIG. 2 is an enlarged detail of FIG. 1 as seen in the direction of the arrow II.

FIG. 3 is a section of the line III—III in FIG. 2.

Figure 1:
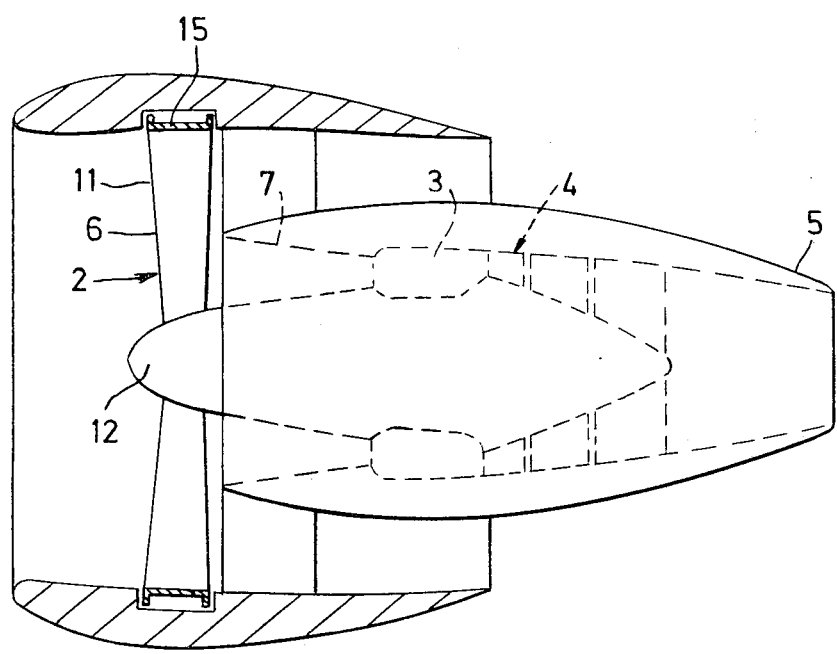
FIG. 1 is an elevation of a gas turbine engine.

Referring to FIG. 1 the engine comprises in flow series a compressor assembly 2, a combustor 3, a turbine assembly 4, connected to drive the compressor assembly, and a nozzle 5. The assembly 2 comprises a low pressure compressor or fan 6 and a high pressure compressor 7. The fan 6 comprises an annular array of rotor blades 11 connected at their radially inner ends to a rotor body 12 and at their radially outer ends to a shroud ring 15.

Figure 4:
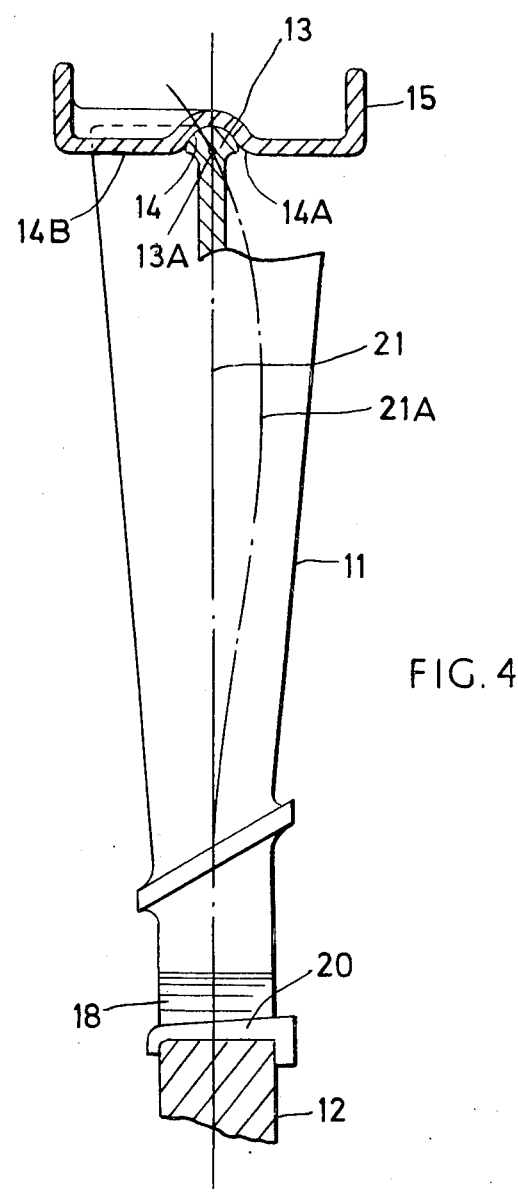
FIG. 4 is a section on the line IV—IV in FIG. 2.

Referring to FIGS. 2 to 4, the connection between the ring 15 and the adjacent end of each blade comprises a recess 14 in a radially inner surface 14B of the ring engaged by a radially outward extension 13 of the blade. The extension 13 lies along the chord 16 (FIG. 3) of the blade section and is itself of half-round cross-section (FIG. 4). The recess 14 is also of half-round cross-section capable of seating the extension 13 such that the blade can pivot by a limited amount about an axis 13A intersecting the center of the half circle. However, the recess also has divergent sides 14A such as to facilitate movement of the extension from the recess under circumstances to be described. The recess 14 extends short of axial end faces of the ring 15, as at 17, so as to fully locate the blade.

The extension 13 and axis 13A may be curved in accordance with the curvature of the ring 15 which would usually be of a diameter sufficiently large for the curving of the recess not to have any adverse effect on the pivotal action. In any case, insofar as the axis 13A is at an angle to the axis of the ring, the axis 13A itself has a lesser curvature than the ring and can for practical purposes be regarded as straight. The axis 13A may therefore be regarded as lying substantially parallel to a tangent, in this case an oblique tangent, of the surface 14A.

At its radially inner end the blade comprises a root 18 engaging an undercut recess 19 in the rotor body. A wedge 20 is arranged to press the root against the undercut surfaces 19A of the recess 19 and to press the blade as a whole so as to urge the extension 13 into the recess 14. The blade is so dimensioned in relation to the body 12 and ring 15 that, during the assembly of the rotor, when the wedge is driven home, the extension 13 beds into the recess 14 before the root 18 engages the undercut surfaces 19A. In this way a satisfactory amount of pre-loading of the extenion 13 and recess 14 can be ensured.

It will be clear that, for normal operation, the blade is held so as to constitute a beam supported at each end. The compression induced in the blade by virtue of the wedge 20 ensures that loads on the ring in normal operation do not allow the blade to become loose in the recess 14. In the event of an undue overload, e.g. a bird striking the blade in a position intermediate between the radial ends thereof and such that the blade would bend by more than in normal operation, the pivotal motion possible between the extension and the recess accommodates such bending without undue strain on the adjacent end of the blade.

Naturally, when the blade bends its overall radial length is reduced and the bending force on the blade may be such as to cause disengagement of the extension 13 from the recess 14. In these circumstances the half-round section of the extension and the tapered sides of the recess tend to allow such disengagement to occur without undue damage to the extension or to the shroud ring. During said bending the deflection of the blade tends to be greater towards the outer end thereof because of relatively greater stiffness of the blade towards its inner end. This is shown in FIG. 4 by center lines 21 and 21A which signify respectively the normal and a deflected condition of the blade.

We claim:

1. A compressor for gas turbine engines comprising a rotor body, an array of radial blades connected at their radially inner ends to the body, a circumferentially continuous shroud ring surrounding the blades at the radially outer ends thereof, the blades having an elongate cross-section, a recess provided in a radially inner surface of the ring adjacent said outer end of each blade, the recess being elongate in the direction of elongation of the cross-section of said outer end, an extension provided at the outer end of each blade, the recess and extension being of curved cross-section as seen in said direction of elongation and the recess having sides which are divergent towards the blade to enable the extension to pivot relative to the recess and slide therefrom in consequence of bending forces on the blade.

2. A compressor according to claim 1, including means arranged between the rotor body and the radially inner ends of the blades for preloading the blades in the direction of their length.

* * * * *